United States Patent [19]

Organek et al.

[11] Patent Number: 5,441,137
[45] Date of Patent: Aug. 15, 1995

[54] CLUTCH WITH A CENTRIFUGALLY APPLIED BALL RAMP ACTUATOR

[75] Inventors: Gregory J. Organek, Dearborn; David M. Preston, Clarkston, both of Mich.

[73] Assignee: Eaton Corporation, Cleveland, Ohio

[21] Appl. No.: 237,797

[22] Filed: May 4, 1994

[51] Int. Cl.⁶ ............................................. F16D 43/22
[52] U.S. Cl. ....................................... 192/35; 192/93 A
[58] Field of Search ............... 192/35, 93 A, 70, 23, 192/103 A, 105 C

[56] References Cited

U.S. PATENT DOCUMENTS

| | | | |
|---|---|---|---|
| 2,085,607 | 6/1937 | Rockwell | 192/35 |
| 2,937,729 | 5/1960 | Sperr, Jr. | 192/35 X |
| 3,091,315 | 5/1963 | Maurice et al. | 192/35 X |
| 3,184,025 | 5/1965 | Aschauer | 192/35 X |
| 3,275,115 | 9/1966 | Timberlake et al. | 192/35 X |
| 4,286,701 | 9/1981 | MacDonald | 192/18 |
| 4,545,470 | 10/1985 | Grimm | 192/56 |
| 4,645,049 | 2/1987 | Matsuda et al. | 192/35 |
| 4,805,486 | 2/1989 | Hagiwara et al. | 74/710.5 |
| 5,019,021 | 5/1991 | Janson | 475/150 |
| 5,078,249 | 1/1992 | Botterill | 192/93 |
| 5,083,986 | 1/1992 | Teraoka et al. | 192/35 X |
| 5,092,825 | 3/1992 | Goscenski et al. | 475/150 |
| 5,322,146 | 6/1994 | Holl et al. | 192/35 X |
| 5,348,126 | 9/1994 | Gad | 192/35 X |

OTHER PUBLICATIONS

2 Pages-FIGS. 4-3 and 4-8 Clutch Release Mechanism Harley-Davidson Motorcycle Maintenance Manual, 1974.

*Primary Examiner*—Andrea L. Pitts
*Attorney, Agent, or Firm*—Loren H. Uthoff, Jr.; Howard D. Gordon

[57] ABSTRACT

A ball ramp mechanism for generating a clutch disc clamping force is disclosed where an activation ring having ramped grooves is connected to a flywheel driven by a prime mover and a control ring having ramped grooves opposing those formed in the activation ring is frictionally connected to a transmission input shaft by a friction shoe contacting a friction ring nonrotatably attached to the transmission input shaft loaded by a centrifugal weight which is pivotally mounted to a coupling link which extends from the control ring.

16 Claims, 3 Drawing Sheets

5,441,137

CLUTCH WITH A CENTRIFUGALLY APPLIED BALL RAMP ACTUATOR

RELATED APPLICATIONS

This application is related to application U.S. Ser. No. 08/165,684 entitled "Ball Ramp Mechanism For A Driveline Clutch", filed on Dec. 13, 1993, and assigned to the same assignee, Eaton Corporation, as this application.

BACKGROUND OF THE INVENTION

1. Field of the Invention

The present invention relates to a vehicle driveline clutch actuator and more specifically to a vehicle driveline clutch actuator using a ball ramp mechanism having a control ring attached to a pivoted weight acting on a friction element.

2. Description of the Prior Art

Driveline clutches commonly use a plurality of springs to clamp a friction disc to an engine flywheel. The springs are disposed within a pressure plate assembly which is bolted to the flywheel. A mechanical linkage that controls the pressure plate spring mechanism is displaced by the operator to control the lock-up and release of the clutch.

Efforts to automate the operation of the clutch using electronics are currently underway. It is known to use an electromechanical or hydraulic actuator connected to the mechanical linkage to, in essence, replace the operator for more accurate clutch operation during transmission shifting. Using such an actuator, the mechanical linkage is moved in response to an electrical control signal generated by a central microprocessor used to process a variety of vehicle sensor inputs and other operating conditions to determine when and in what manner the driveline clutch should be activated, or deactivated.

The use of a ball ramp actuator to lcad a clutch pack in a vehicle driveline differential is known. U.S. Pat. Nos. 5,092,825 and 4,805,486, the disclosures of which are hereby incorporated by reference, disclose limited slip differentials where a clutch pack is loaded in response to the activation of a ball ramp actuator initiated by rotation of a servo motor or a solenoid driven brake shoe on an activating ring. The advantage of the ball ramp mechanism over other actuators is that it converts rotary motion into axial motion with a very high force amplification, often 100:1 or greater. A ball ramp actuator has also been utilized in a vehicle transmission to engage and disengage gearsets by loading a gear clutch pack in response to a signal as disclosed in U.S. Pat. No. 5,078,249 the disclosure of which is hereby incorporated by reference.

In both of these applications, one side of the ball ramp actuator, commonly called a control ring, reacts against case ground through the force induced by an electromagnetic field generated by a coil or is rotated by an electric motor relative to case ground. To generate greater clamping forces, the electrical current supplied to the coil or motor is increased thereby increasing the reaction of the control ring to case ground which rotates the control ring relative to an activation ring thereby causing rolling elements to engage ramps in the control and activation ring which increase the axial movement and clamping force on the clutch pack. However, a limitation of the prior art is that the use of additional electrical current to continuously maintain the clamping force is inefficient and requires that the coil be large to accommodate the current without overheating. More importantly, by reacting the control ring to case ground, a large amount of rotation slip is constantly present which results in wasted power.

Another problem with the prior art is that speed sensors are required to measure flywheel speed and transmission input shaft speed and a microprocessor is required to rapidly interpret these speed signals, calculate a slip speed and then generate a control signal to the coil to increase the axial lock-up force of the ball ramp actuator should slip occur through the clutch. This approach is slow and excessive slip occurs before action can be taken to increase the clamping force. Excessive slip wears out the clutch prematurely.

Another problem is with vehicle start-up when the clutch is first engaged under a variety of operating conditions. The engagement using the prior art system can be rough and unpredictable with excessive clutch slip or abrupt engagement. This operation results in premature wear, driveline shock and driver complaints.

SUMMARY OF THE INVENTION

Accordingly, it is a provision of the present invention to provide an improved driveline clutch actuator using a ball ramp actuator having a control ring frictionally connected to a transmission input shaft using the centrifugal force generated by a pivoted weight.

More specifically, it is a provision of the present invention to provide an improved driveline clutch actuator control system in which the force used to cause relative angular rotation between a control ring and an actuation ring in a ball ramp actuator resulting in the application of a clamping force to a clutch friction disc is generated by the relative rotation of a prime mover (engine) and a transmission input shaft where the control ring is frictionally connected to the input shaft using the centrifugal force generated by a pivoted weight.

Even more specifically, it is a provision of the present invention to provide an improved driveline clutch actuator control system in which the force used to cause relative angular rotation between a control ring and an actuation ring in a ball ramp actuator resulting in the application of a clamping force to a clutch friction disc is generated by the relative rotation of a prime mover (engine) and a transmission input shaft where the control ring is frictionally connected to the input shaft using the centrifugal force generated by a pivoted weight further controlled by a coil energized by a clutch control electronic module.

The present invention provides for an improved actuator for an electronically controlled clutch such as might be used in a motor vehicle driveline. The ball ramp actuator of the present invention is characterized by an engine flywheel and a transmission input shaft being coupled through a driveline clutch where the ball ramp mechanism is energized upon relative rotation between the control ring and activation ring where the control ring is frictionally connected to the transmission input shaft and the activation ring is connected to the flywheel. The ball ramp actuator is energized using a friction shoe which is forced against a friction ring attached and rotating with the transmission input shaft. The ball ramp actuator provides a clamping force on the clutch friction disc whose amplitude immediately increases with the differential speed between the input (flywheel) and transmission input shaft due to the nature of the ball ramp mechanism using rolling elements travelling within variable depth ramps. Upon lock-up between the flywheel and the transmission input shaft, the parasitic energy loss is minimized since there is no slippage in the control clutch which is connected to the transmission input shaft as opposed to case ground as found in prior art systems.

The ball ramp actuator comprises a plurality of roller elements, a control ring and an adjacent activation ring where the activation ring and the control ring define at least three opposed ramp surfaces formed as circumferential semi-circular grooves, each pair of opposed grooves containing one roller element. A thrust bearing is interposed between the control ring and a housing member, rotating with and connected to the input member such as a flywheel for reaction against the ball ramp mechanism.

A weight is pivotally supported from a control link which is connected to the control ring. The weight generates a centrifugal force which loads a friction pad against a friction ring nonrotatably attached to the transmission input shaft. In this manner, the transmission input shaft is frictionally connected to the control ring of the ball ramp mechanism while the activation ring is connected to the flywheel. Thus, if there is relative rotation between the flywheel and the transmission input shaft, there will be a relative rotation induced between the control ring and the activation ring which will cause the ball ramp mechanism to axially expand thereby applying additional clamping Icad to the main driveline clutch disc.

An electromagnetic coil is attached to the transmission housing and magnetically reacts with the centrifugal weight. The coil creates an electromagnetic field so as to magnetically interact with the weight thereby negating the centrifugal force generated by the weight. In this manner, the clutch control electronics which supplies electrical power to the coil can control the Icad executed by the weight to the friction shoe on the friction ring thereby controlling the activation of the ball ramp mechanism and consequently the engagement of the driveline clutch.

By frictionally coupling the control clutch to the transmission input shaft and rotationally coupling the activation ring of the ball ramp actuator to the engine flywheel, the relative rotation of the activation ring and the control ring is automatically induced with any increase in relative rotational speed (slip) between the flywheel and the transmission input shaft.

The present invention has a very low parasitic energy loss, especially when the flywheel is rotating at the same speed as the transmission input shaft since there is virtually no slip at the friction pad. In prior art devices, one side of the control clutch is typically grounded to a stationary structural member instead of a rotating input or output shaft which results in high slip speeds and parasitic losses even when the input shaft is locked to the output shaft.

By connecting the activation ring to the clutch pressure plate and the control ring to the transmission input shaft through the friction pad loaded by the centrifugal weight, the response to clutch slip is automatic and virtually instantaneous. Since the control ring is attached through the friction pad to the transmission input shaft, any clutch slip causes relative rotation of the control plate and the activation plate in the ball ramp mechanism which increases the clamping force on the clutch pressure plate with little or no energy loss and with virtually instantaneous response.

DETAILED DESCRIPTION OF THE PREFERRED EMBODIMENT

Figure 1:
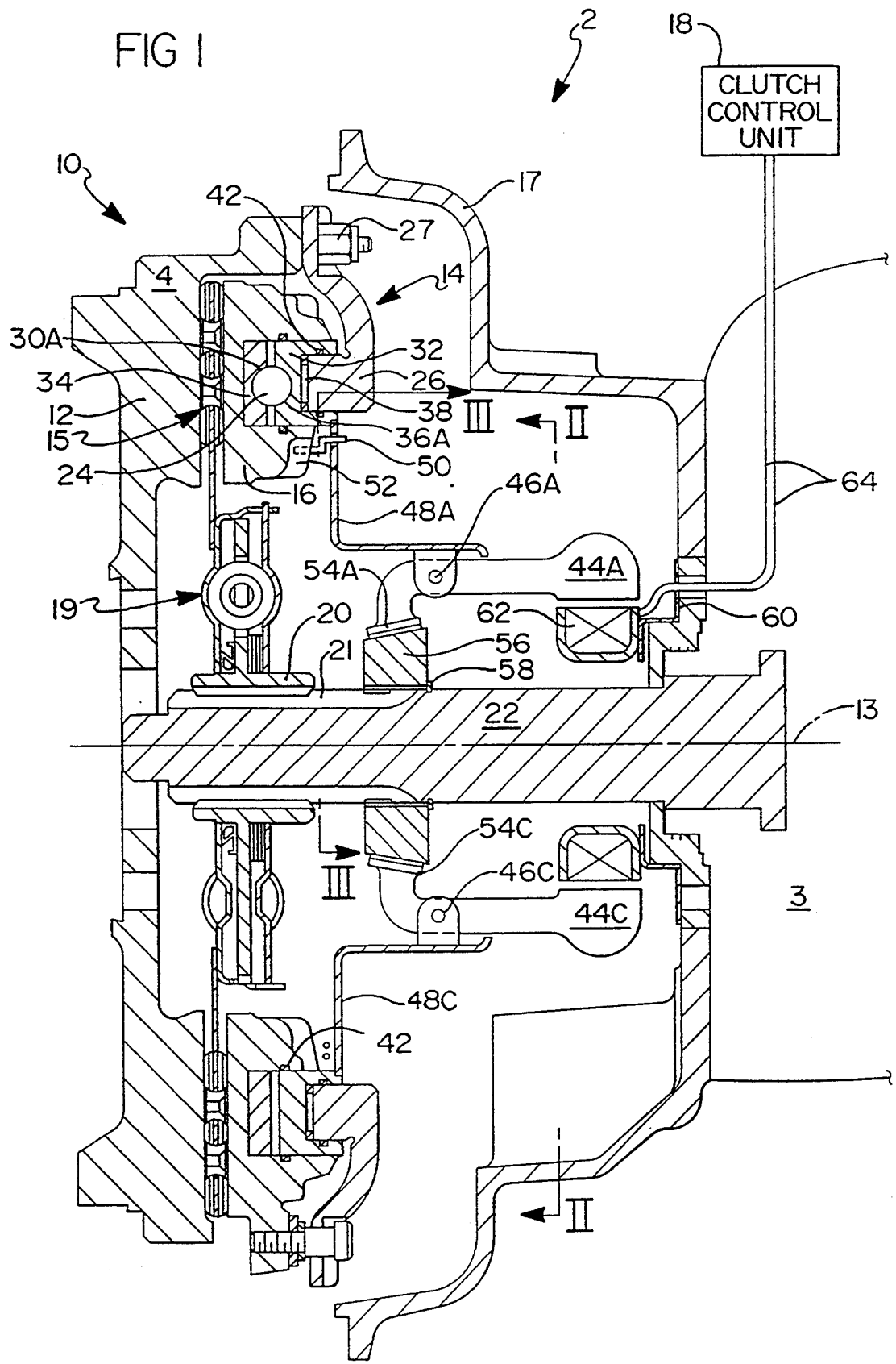
FIG. 1 is a partial cross-sectional view of the clutch actuator of the present invention mounted within a clutch housing.

Referring now to the drawings, which are not intended to limit the present invention, FIG. 1 is a cross-sectional view of the main driveline clutch assembly 2 of the type in which the present invention may be utilized. The main driveline clutch assembly 2 includes a flywheel 4 rotatably driven by a prime mover (not shown) such as an internal combustion engine by its output crankshaft (not shown) which is coupled to a transmission 3 by a clutch 10. A bellhousing 17 surrounds the flywheel 4 and supports the transmission 3 including the transmission input shaft 22 which extends to nonrotatably engage a clutch disc 19 through a disc spline 20. A pressure plate 16 is used to clamp the clutch disc 19 through attached friction pads 15 to the flywheel 4 thereby transferring the rotational power from the prime mover to the transmission 3 through the transmission input shaft 22 and eventually to the rest of the vehicle driveline.

The pressure plate 16 is commonly forced toward the flywheel 4 using a plurality of high rate clutch springs. When the operator wishes to disengage the clutch disc 19, a mechanical release mechanism is activated by the operator's foot and leg to overcome the force of the springs thereby allowing the clutch disc 19 to slip relative to the flywheel 4. It should be understood, however, that neither the springs nor the mechanical release mechanism are features of the present invention. The present invention utilizes a ball ramp mechanism 14 to force the pressure plate 16 toward the flywheel 4 which is controlled by an electronic clutch control unit 18 rather than an operator during most transmission shifting sequences.

Using the present invention, the clutch disc 19 is clamped between the pressure plate 16 and the flywheel 4 through an axial movement of a ball ramp mechanism 14. The ball ramp mechanism 14 axially depends with a relatively large force when energized reacting against a thrust bearing 38 on one side and the pressure plate 16 on the opposite side. The ball ramp mechanism 14 is comprised of an annular control ring 32 and an opposed annular activation ring 34 separated by a plurality of rolling elements 24 each riding in a pair of opposed variable depth grooves 30A and 36A which establish axial separation distance between the control ring 32 and the activation ring 34.

The control ring 32 is connected to centrifugal weights 44A,44B,44C and 44D which are pivotively attached to a respective number of coupling links 48A,48B,48C and 48D and cause friction shoes 54A,54B,54C and 54D to contact a friction ring 56 which is nonrotatably fixed to the transmission input shaft 22. The coupling links 48A-48D are attached to the control ring 32. The control ring 32 is supported in the pressure plate 16 but can rotate relative to it and the interface is lubricated and sealed by oil seals 42. It is also supported on a ramp support 26 and likewise sealed from it by oil seals 42 so that lubricant cannot leak from the thrust bearing 38. The ramp support is attached to the flywheel 4 by bolts 27. The activation ring 34 is supported and nonrotatably attached to the pressure plate 16. Thus, the activation ring 34 rotates with the flywheel 4 while the control ring 32 rotates with the transmission input shaft 22 through the frictional interface of the friction shoes 54A-54D forced against the friction ring 56 by the centrifugal force generated by the weights 44A-44D.

When the clutch disc 19 is unclamped or starts to slip due to excessive torque supplied by the prime mover (engine) through the flywheel 4, there is relative rotation between the activation ring 34 and the control ring 32 thereby forcing the rings 32 and 34 axially further apart (as described in detail infra) thereby increasing the clamping force of the pressure plate 16 on the clutch disc 19 at the friction pads 15 and flywheel 4. This occurs through a small range of rotational motion of the control ring 32 relative to the activation ring 34 and provides an automatic, virtually instant, clamping force adjustment should any rotational slipping occur between the flywheel 4 and the transmission input shaft 22.

The clutch bellhousing 17 encloses the clutch 10 including the ball ramp mechanism 14 of the present invention. Ball ramp mechanisms are well known in the art and have been used to lcad transmission gear clutches as disclosed in U.S. Pat. No. 5,078,249, and differential clutch packs as disclosed in U.S. Pat. No. 5,092,825 where the ball ramp control ring is reacted against case ground by a coil or motor, the disclosures of which are hereby incorporated by reference. In essence, relative motion between a control ring 32 and an activation ring 34 causes one or more rolling elements 24, such as spherically shaped elements, to be moved along a like number of opposed ramps 30 and 36 formed in the activation ring 34 and the control ring 32, respectively.

Figure 2:
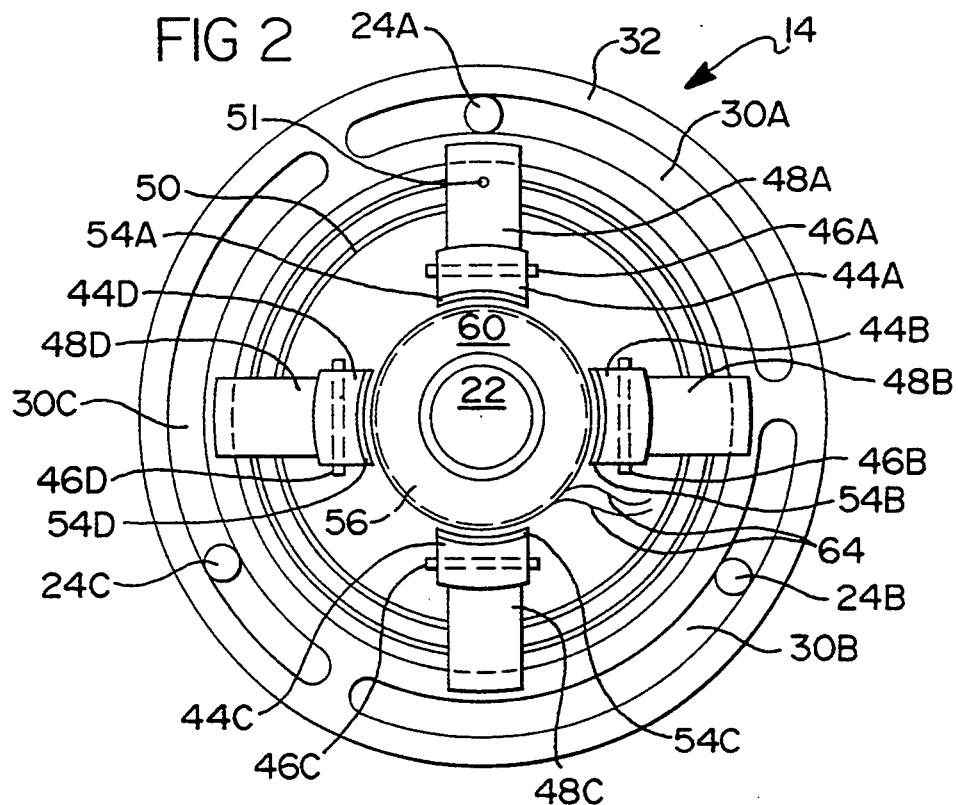
FIG. 2 is a cross-sectional view of the clutch actuator of the present invention taken along line II—II of FIG. 1.

The control ring 32 is frictionally connected to the transmission input shaft 22 through a plurality of friction shoes 54A,54B,54C and 54D frictionally contacting a friction disc 56. The brake shoes 54A-54D are forced against the friction disc 56 as the prime mover (engine) spins the flywheel 4, pressure plate 16 and ball ramp mechanism 14 assembly through the use of at least one weight 44A pivotively mounted to a coupling link 48 with pivot 46A which is attached to the control ring 32. The weight 44A is acted upon by centrifugal force as the flywheel 4 turns which in turn tends to throw the weight 44A outward and applies a force through the pivot 46A on the brake shoe 54. The friction shoe 54A is forced against the friction disc 56 which is nonrotatably connected to the transmission input shaft 22 and fixed axially to the shaft 22 with a clip 58. In FIG. 1, two weights 44A and 44C, two friction shoes 54A and 54C, two pivots 46A and 46C and two coupling links 48A and 48C are shown. Any number of these components could be employed to implement the present invention and reference to one mean reference to all. FIG. 2 shows four of the elements being used equally spaced around the periphery of the friction disc 56. Thus, the control ring 32 is frictionally connected to the transmission input shaft 22 through the coupling links 48A,48B,48C and 48D and the pivot pins 46A,46B,46C and 46D and the friction shoes 54A,54B,54C and 54D and the friction disc 56. The coupling of the control ring 32 to the input shaft 22 and the connection of the activation ring 32 to the flywheel 4 through the pressure plate 16 and the ramp support 26 allows for the activation of the ball ramp mechanism 14 whenever there is relative motion between the flywheel 4 and the transmission input shaft 22. The centrifugal force generated by the weights 44A,44B,44C and 44D due to their rotation causes the weights 44A-44D to be forced outward away from the input shaft 22 which through the pivots 46A-46D loads the friction shoes 54A,54B,54C and 54D against the friction disc 56.

To release the clutch 10, the ball ramp mechanism 14 is caused to axially contract by releasing the force on the friction shoes 54A-54D against the friction disc 56. To accomplish this result, an annular electrical coil 62 is energized with the clutch control unit 18 electrically connected to the coil 62 through leads 64. The coil 62 is mounted to the housing of the transmission 3 or the bellhousing 17 using mounting bracket 60. Upon energization of the coil 62 by the clutch control unit 18, an electromagnetic field is produced which magnetically attracts the weights 44A,44B,44C and 44D to the coil 62 thereby counteracting the centrifugal forces generated by the weights 44A-44D and preventing the weights 44A-44D from being moved outward away from the input shaft 22. Once the coil 62 is energized, the frictional coupling of the friction shoes 54A-54D to the friction disc 56 can be controlled electronically by the clutch control unit 18 thereby controlling the activation of the ball ramp mechanism 14 and the clutch 10. The relative rotation between the control ring 32 and the activation ring 34 determines their axial separation distance.

As the relative rotation of the control ring 32 and the activation ring 34 is increased, the axial separation distance of the ball ramp mechanism 14 is also increased resulting in an increased clamping force on the clutch disc 19 through the friction pads 15. The ball ramp mechanism 14 reacts in one direction toward the pressure plate 16 and in the opposite direction against ramp support 26 which is attached to the flywheel 4 with fasteners 70.

A thrust bearing 38, which can be any type of thrust bearing, is used to contain the axial forces generated by the ball ramp rolling elements 24 as they engage the ramps 30 and 36 in the activation ring 34 and the control ring 32. Rotation of the control ring 32 causes the activation ring 34 to move axially toward the flywheel 4 clamping the clutch disc 19 between the pressure plate 16 and the flywheel 4.

When the coil 62 is fully energized to release the clutch 10, a centering spring 50 is used to center the rotational orientation of the control ring 32 and the activation ring 34 so that the ball ramp mechanism 14 is fully axially contracted to release the clutch 10. The centering spring 50 holds this position between the control ring 32 and the activation ring 34 until the magnetic field established by the coil 62 is reduced in magnitude and the flywheel 4 speed is increased so that the centrifugal force generated by the rotating weights 44A-44D cause the friction shoes 54A-54D to contact the friction ring 56. One end of the centering spring 50 is retained by the pressure plate 16 in a centering spring retainer 52 while a second end is retained in the coupling link 48A.

Now referring to FIG. 2, a cross-sectional view of a portion of the ball ramp mechanism 14 of the present invention taken along line II—II of FIG. 1 is shown. Three rolling elements 24A,24B and 24C are shown in an intermediate energization position in ramps 30A,30B and 30C respectively. The ramps 30A,30B and 30C are formed as semi-circular, circumferential shaped channels having a variable axial depth. Opposed identical sets of ramps are formed in the control ring 32 and the activation ring 34 such that the rolling elements 24A-24C are trapped, one in each opposed pairs of channels. Rolling element 24A travels within ramps 30A and 36A, and rolling element 24B travels within ramps 30B and 36B, and rolling element 24C travels within ramps 30C and 36C. The operation of the ball ramp mechanism 14 is discussed in more detail subsequently with reference to FIGS. 4, 5 and 6.

FIG. 2 shows the four centrifugal weights 44A,44B,44C and 44D pivotally connected to their four respective coupling links 48A,48B,48C and 48D using pivot pins 46A,46B,46C and 46D respectively. The friction shoes 54A,54B,54C and 54D are shown in a noncontacting position relative to the friction disc 56. Also shown is the centering spring 50 which has one end 51 attached to the coupling link 48A which is attached to the control ring 32 and a second end which is attached to the activation ring 34. The centering spring 50 is deflected whenever the control ring 32 and the activation ring 34 are positioned such that the opposed ramps 30A,36A, and 30B,36B and 30C,36C are out of alignment as shown in FIG. 2 and further by reference to FIG. 6.

Figure 3:
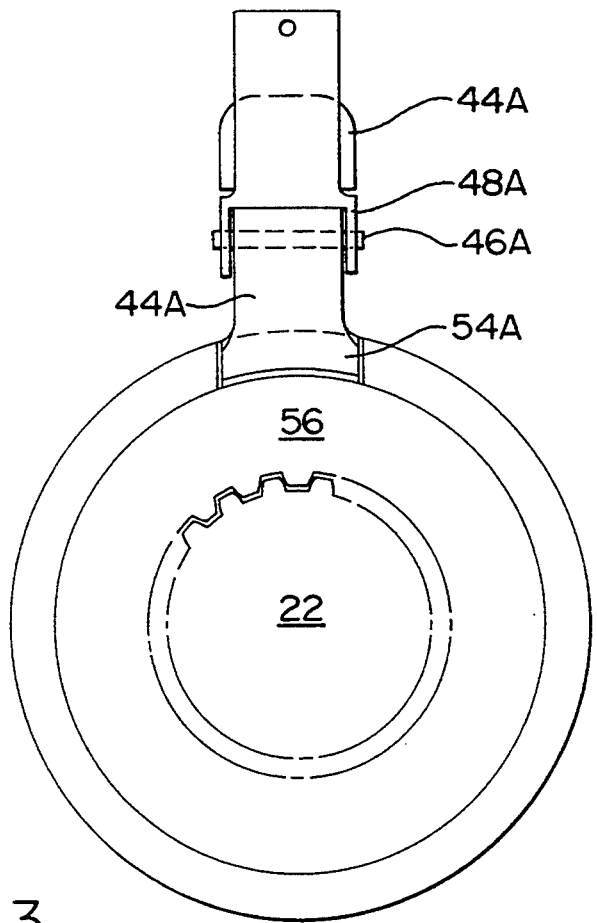
FIG. 3 is a cross-sectional view of the present invention taken along line III—III of FIG. 1.

FIG. 3 is a cross-sectional view of the present invention taken along line III—III of FIG. 1 showing the weight 43, friction shoe 54 and friction disc 56 mechanism. The weight 43 is pivoted on the coupling link 48A with pivot pin 46A. This permits the weight 44A to apply a force on the friction pad 54A against the friction disc 56 which frictionally couples the control ring 32 to the transmission input shaft 22 through the coupling link 48A.

Figure 4:
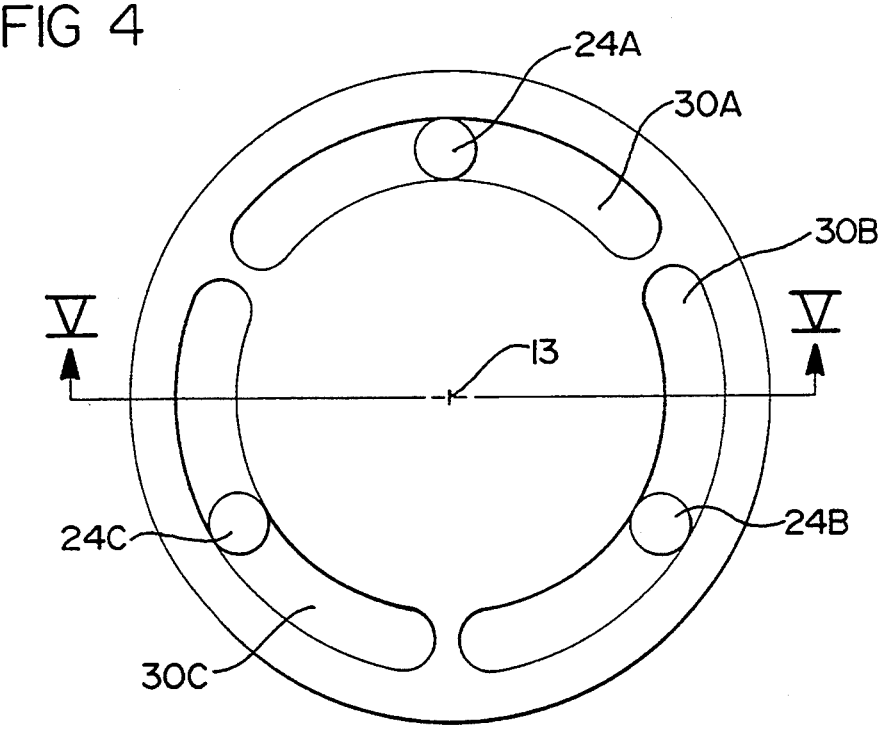
FIG. 4 is an axial cross-sectional view of the ball ramp mechanism of the present invention as shown in FIG. 2.
Figure 5:
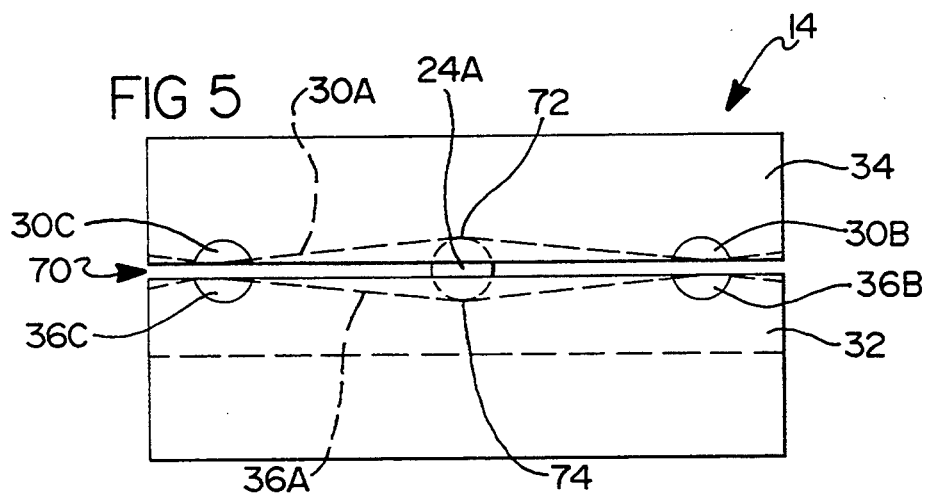
FIG. 5 is a cross-sectional view of the ball ramp mechanism of the present invention in a non-energized state taken along line V—V of FIG. 4.
Figure 6:
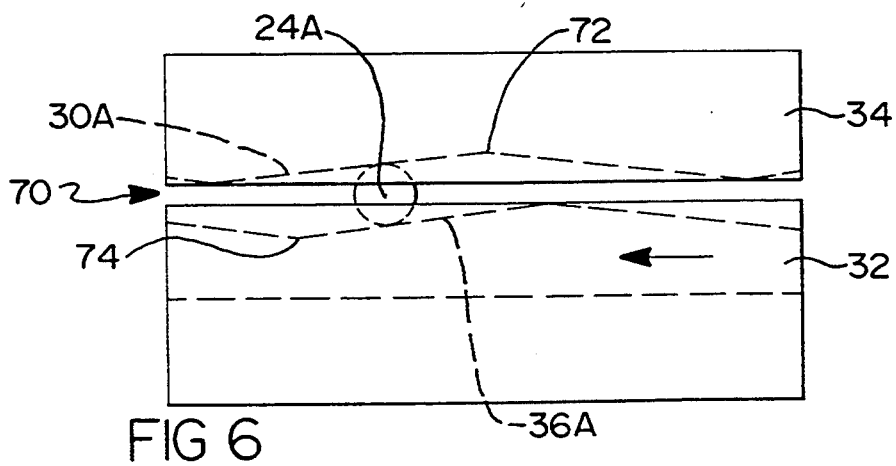
FIG. 6 is a cross-sectional view of the ball ramp mechanism of the present invention in an energized state taken along line V—V of FIG. 4.

Referring now to FIGS. 4, 5 and 6 to describe the operation of the ball ramp actuator 14, a cross-sectional view of the ball ramp actuator 14 is shown in FIG. 4 and views taken along line V—V of the activation ring 34 and the control ring 32 separated by a spherical element 24A are shown in FIGS. 5 and 6. Three spherical rolling elements 24A,24B and 24C are spaced approximately 120° apart rolling in three variable depth ramps (grooves) 30A,30B and 30C respectively as the control ring 32 is rotated relative to the activation ring 34. Any number of spherical rolling elements 24A and respective ramps 30A could be utilized depending on the desired rotation and axial motion of the ball ramp actuator 14. It is desirable to employ at least three spherical rolling elements 20A-20C travelling on a like number of identical opposed ramps 30A-30C formed in both the control ring 32 and the activation ring 34 to provide stability. Any type of rolling element 24A could be utilized such as a ball or a roller. The activation ring 34 is shown which rotates with the pressure plate 16, the ramp support 26 and the flywheel 4 turning about axis of rotation 13 coincident with the axis of rotation of the transmission input shaft 22.

Three semi-circular, circumferential ramps 30A,30B and 30C are shown formed in the face of the activation ring 34, also referred to as grooves, with corresponding identical opposed ramps 36A,36B and 36C (where 36B and 36C are not fully shown) formed in the face of the control ring 32 as shown in FIG. 5. The control ring 32 and the activation ring 34 are made of a high strength steel with the ramps 30A,30B,30C,36A,36B and 36C carburized and hardened to $R_c55-60$. The ramps 30A-30C and 36A-36C vary in depth as clearly shown in FIG. 5 and circumferentially extend for approximately 120° (actually less than 120° to allow for a separation section between the ramps). The axial separation distance 70 between the control ring 32 and the activation ring 34 is determined by the rotational orientation between the two corresponding opposed ramps such as 30A and 36A where the spherical rolling element 34A rolls on each ramp 30A and 36A as the control ring 32 is rotated relative to the activation ring 34 on the same axis of rotation. The relative rotation forces the control ring 32 and the activation ring 34 apart or allows them to come closer together as determined by the position of the rolling elements 24A,24B and 24C as positioned in their respective ramp pairs 30A,36A and 30B,36B and 30C,36C thereby providing an axial movement for clamping the clutch disc 19 between the pressure plate 16 and the flywheel 4.

FIG. 5 illustrates the rotational orientation of the control ring 32 and the activation ring 34 when the axial separation distance 70 is at a minimum as when the ramps 30A and 36A are aligned and the spherical element 24A is in the deepest section of the ramps 30A and 36A. As the control ring 32 is rotated relative to the activation ring 34 by application of a control torque input from the friction shoes 54A-54D contacting the friction disc 56, the ramps 30A and 36A move relative to one another causing the spherical element 24A to roll on each of the ramp surfaces 30A and 36A moving to a different position on both ramps 30A and 36A as shown in FIG. 6, thereby forcing the control ring 32 and the activation ring 34 apart thereby increasing the separation distance 70. A similar separation force is generated by rolling element 24B rolling on ramp surfaces 30B and 36B and by rolling element 24C rolling on ramp surfaces 30C and 36C. The rotation of the control ring 32 is clearly illustrated in FIGS. 5 and 6 by the relative shift in position of reference points 72 and 74 from directly opposed in FIG. 5 to an offset position in FIG. 6 caused by rotation of the control ring 32 in the direction of the arrow. This axial displacement can be used for a variety of applications since the force level relative to the torque applied to the control ring 32 is quite high, typically a ratio of 100:1. This can be used as illustrated in this application to load the pressure plate 16 against the clutch disc 19 and flywheel 4 in a vehicle driveline. Additional illustrative details of operation of a ball ramp actuator can be found by reference to U.S. Pat. No. 4,805,486.

According to the present invention, once the clutch 10 is locked-up, the weights 44A-44D rotate at the same speed as the flywheel 4 and the centrifugal force generated by the weights 44A-44D and maintain clutch assembly 5 lock-up.

As disclosed in the present application, by frictionally connecting the control ring 32 to the transmission input shaft 22, very little clutch slip occurs when the ball ramp actuator 14 is energized thereby maintaining lockup of the clutch 10 without energy input. Also, the reaction time to even minimal slipping of the clutch disc 19 using the present invention is vertically instantaneous since slippage of the clutch disc 19 results in relative motion between the pressure plate 16, flywheel 4 and activation ring 34 assembly and the transmission input shaft 22, friction disc 56, friction shoes 54A–54D, coupling links 48A–48D, and control ring 32 assembly. The pressure plate 16 is coupled through the ramp support 26 and with a plurality of bolts 27 to the flywheel 4 all rotating together.

Thus, according to the present invention, friction shoes 54A–54D connect the control ring 32 to the transmission input shaft 22 using the centrifugal force created by the weights 44A–44D, clamping force on the clutch disc 19 to prevent further slippage automatically without command from the clutch control electronics 15.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

We claim:

1. A ball ramp mechanism for coupling two rotating elements comprising:
   an input element rotating about an axis of rotation;
   an output element having an axis of rotation coaxial with said axis of rotation of said input element for rotating an output device;
   a ball ramp actuator for generating an axial movement comprising; an annular control ring frictionally coupled to said output element and rotating therewith, said control ring having at least two circumferential control ramps formed in a first face of said control ring, said control ramps varying in axial depth, an equivalent number of rolling elements one occupying each of said ramps, an activation ring having an axis of rotation along said axis of rotation of said control ring, said activation ring having at least two activation ramps substantially identical in number, shape and radial position to said control ramps in said control ring where said activation ramps at least partially oppose said control ramps and where each of said rolling elements is trapped between said activation ramp and a respective at least partially opposed control ramp, said control ring axially and rotationally movably disposed relative to said activation ring;
   coupling means for rotatably joining said input element to said output element where said coupling means varies the degree of rotational coupling between said input element and said output element according to the axial position of said control ring relative to said activation ring;
   a friction ring nonrotatably attached to and encircling said output member;
   a coupling link extending from and attached to said control ring;
   a centrifugal weight pivotally attached to said coupling link having a first end for moving outward from said output shaft upon rotation of said centrifugal weight and a second end for moving inward toward said friction ring upon rotation of said centrifugal weight; and
   a friction shoe mounted to said second end of said centrifugal weight for frictionally engaging said friction ring.

2. The ball ramp mechanism of claim 1, further comprising an electrical coil for electromagnetically attracting said first end of said centrifugal weight to inhibit the movement of said centrifugal weight outward from said output shaft.

3. The ball ramp mechanism of claim 2, wherein said coil is annularly shaped encircling said output shaft and attached to a gearbox housing.

4. The ball ramp mechanism of claim 1, wherein said input element comprises a flywheel and where said output element comprises a transmission input shaft.

5. The ball ramp mechanism of claim 1, wherein said rolling elements are spherically shaped.

6. The ball ramp mechanism of claim 1, wherein said coupling means is a friction clutch assembly comprising: a flywheel attached to said input element having a friction surface; a clutch disc having a first friction surface for frictionally reacting against said flywheel friction surface and a second friction surface; a pressure plate having a friction surface for frictionally reacting against said clutch disc second friction surface where said pressure plate is connected to said flywheel and nonrotatably connected to said activation ring.

7. The ball ramp mechanism of claim 1, wherein a centering spring reacts against said control ring and said activation ring.

8. A driveline clutch for coupling a flywheel to a transmission input shaft comprising:
   a flywheel rotated about an axis of rotation by a prime mover;
   a driveline transmission having an input shaft and a housing;
   a clutch disc nonrotatably attached to said input shaft and radially extending from said input shaft and having friction material on a first surface and a second surface where said first surface frictionally engages said flywheel;
   a pressure plate encircling said input shaft having a first surface for frictionally engaging said second surface of said clutch disc;
   a ball ramp mechanism for moving said pressure plate toward said clutch disc and said flywheel thereby causing said clutch disc to be clamped therebetween comprising; an activation ring encircling said input shaft, said activation ring being axially slidingly connected to said pressure plate where axial movement of said activation ring results in axial movement of said pressure plate acting through a spring, a control ring encircling said input shaft and disposed adjacent to said activation ring, said control ring and said activation ring having opposed faces provided with circumferentially extending grooves, arranged in at least three opposed pairs of grooves, said grooves having portions of varying depth, and rolling members disposed one in each opposed pair of grooves, the grooves on said activation ring and said adjacent control ring being arranged so that relative angular movement of axial activation ring and control ring in either direction, from a starting position thereof, causes axial movement of said activation ring away from said control ring and operating through said spring to axially displace said adjacent pressure plate;

an annular friction ring nonrotatably attached to said transmission input shaft;

at least one coupling link extending from said control ring;

at least one centrifugal weight pivotally mounted to said coupling link having a first end for moving outward from said transmission input shaft upon rotation of said centrifugal weight and a second end for moving inward toward said friction ring upon rotation of said centrifugal weight; and a friction shoe mounted to said second end of said centrifugal weight for frictionally engaging said friction ring.

9. The driveline clutch of claim 8, wherein said rolling members are spherical.

10. The driveline clutch of claim 8, wherein said activation ring reacts against a second surface of said pressure plate, said second surface opposing said first surface of said pressure plate.

11. The driveline clutch of claim 8, wherein a torsional centering spring contacts said pressure plate and reacts against said coupling link to supply a centering force to said control ring with respect to said activation ring tending to rotatably return said control ring and said activation ring to said starting position.

12. A driveline clutch employing a ball ramp actuator comprising:

an input shaft rotatable about an axis of rotation;

an output shaft rotating about said axis of rotation;

a flywheel having a friction surface, said flywheel attached to said input shaft and rotating therewith about said axis of rotation;

a clutch disc having a first friction surface and a second friction surface rotatable about said axis of rotation of said input shaft, said first friction surface opposed to said flywheel friction surface;

a pressure plate having a friction surface opposed to said second friction surface of said clutch disc, said pressure plate rotatable about said axis of rotation and nonrotatably connected to said flywheel;

a ball ramp actuator for axially displacing said pressure plate toward said flywheel, said ball ramp actuator comprising a control ring and an activation ring having opposed faces provided with circumferentially extending grooves, arranged as at least three opposed pairs of grooves, including portions of varying depth, and rolling members disposed one in each opposed pair of grooves, the grooves on said activation ring and said adjacent control ring being arranged so that relative angular movement of said activation ring and control ring in either direction, from a starting position thereof, causes axial movement of said activation ring away from said control ring to move said pressure plate toward said flywheel thereby clamping said clutch disc, said activation ring being linked to said pressure plate; said control ring and said activation ring rotatable about said axis of rotation;

a friction ring attached to said output shaft and rotating therewith;

coupling means for linking said output shaft to said control ring comprising; a weight pivotally attached to a coupling link where said coupling link is attached to said control ring, said weight movably disposed to apply a centrifugal force to a friction shoe attached to said weight and contacting said friction ring.

13. The driveline clutch of claim 12, wherein said input element comprises a flywheel and where said output element comprises a transmission input shaft.

14. The driveline clutch of claim 12, wherein said rolling members are spherically shaped.

15. The driveline clutch of claim 12, wherein a centering spring reacts against said control ring and said activation ring.

16. The driveline clutch of claim 15, wherein said centering spring contacts said pressure plate at one end and contacts said coupling link at a second end.

* * * * *